United States Patent [19]

Herman

[11] Patent Number: 5,205,185
[45] Date of Patent: Apr. 27, 1993

[54] HANDLEBAR

[75] Inventor: William P. Herman, Marblehead, Mass.

[73] Assignee: Hsin Lung Accessories Co., Ltd., Taipei Hsien, Taiwan

[21] Appl. No.: 684,002

[22] Filed: Apr. 11, 1991

[51] Int. Cl.$^5$ .................................................. B62K 21/12
[52] U.S. Cl. .................................. 74/551.1; 74/551.8
[58] Field of Search ................ 74/551.1, 551.3–551.8; D12/178; 280/289 H, 261

[56] References Cited

U.S. PATENT DOCUMENTS

| | | | |
|---|---|---|---|
| 4,250,770 | 2/1981 | Robertson, Jr. | 74/551.8 |
| 4,479,663 | 10/1984 | Morris et al. | 280/289 H |
| 4,503,729 | 3/1985 | Shimano | 74/551.1 |
| 4,750,754 | 6/1988 | Lennon | 280/289 H |
| 4,878,397 | 11/1989 | Lennon | 280/289 H |
| 5,117,708 | 6/1992 | Boyer et al. | 74/551.1 |

FOREIGN PATENT DOCUMENTS

| | | |
|---|---|---|
| 0092678 | 4/1896 | Fed. Rep. of Germany . |
| 2235816 | 2/1973 | Fed. Rep. of Germany ..... 74/551.3 |
| 2931826 | 2/1981 | Fed. Rep. of Germany ..... 74/551.4 |
| 0953453 | 12/1949 | France . |

OTHER PUBLICATIONS

Profile, Leader by Design, 1990, Chicago, Ill.
MountainBike Action, May 1991.

Primary Examiner—David A. Scherbel
Assistant Examiner—Winnie Yip
Attorney, Agent, or Firm—Wolf, Greenfield & Sacks

[57] ABSTRACT

A handlebar with integral bar ends provides an elongate tubular member having opposing segments proximate a central region thereof. The segments each have an outer diameter sufficient for affixing a conventional control base thereto. Disposed outwardly of each of the segments is a respective relatively transverse end segment. In particular, the end segment may be angled at 70° relative to a longitudinal axis of each of the segments. The outer diameter of the end segment is sized so that, in conjunction with a predetermined radius of curvature for a bend between each end segment and segment, the control base may be moved between the end segment and the segment without interference. The outer diameter of each end segment may be 20 millimeters while the radius of curvature of the bend may be 55 millimeters.

12 Claims, 2 Drawing Sheets

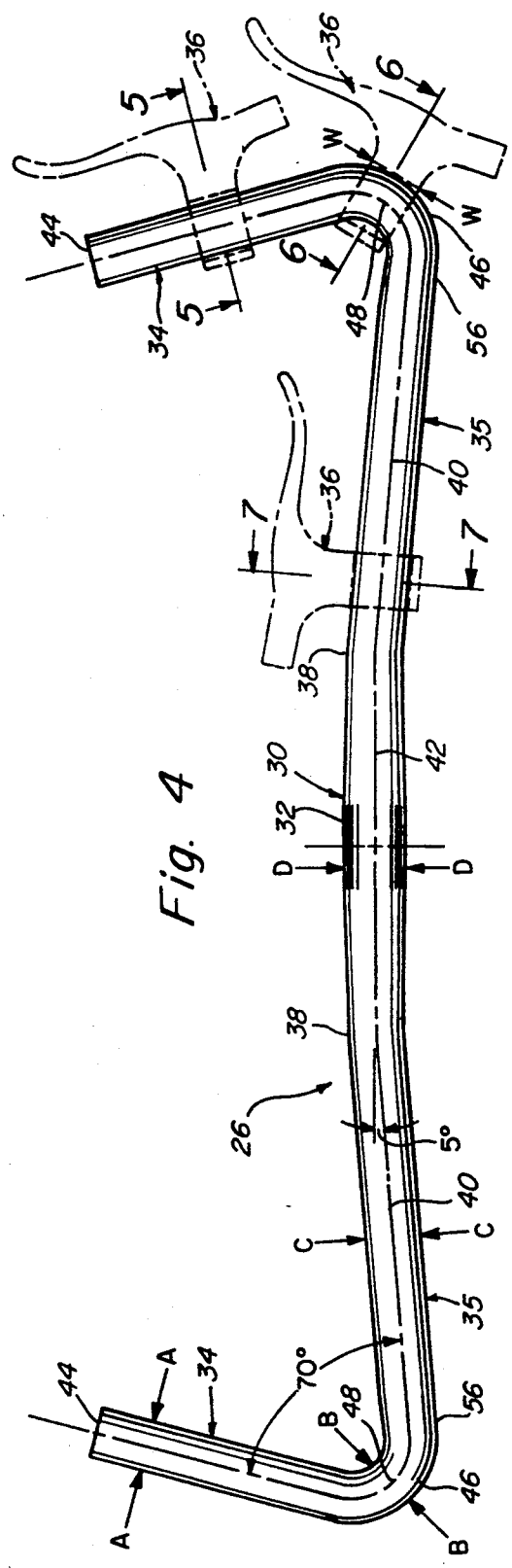
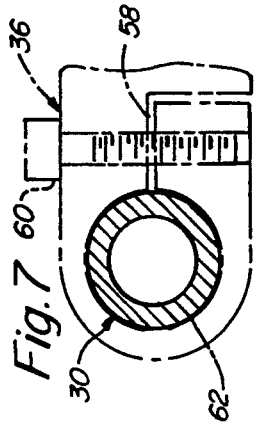
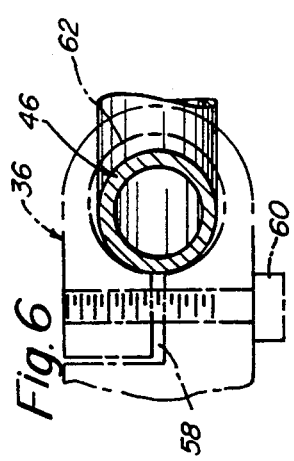
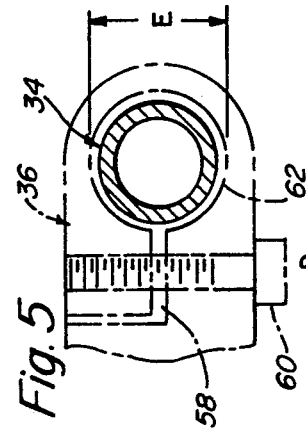
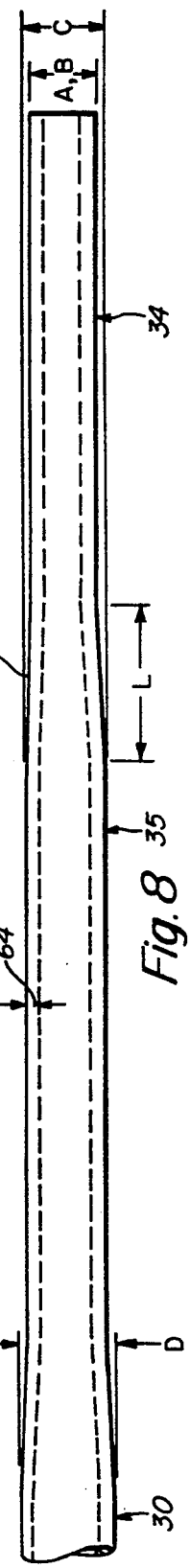

HANDLEBAR

FIELD OF THE INVENTION

This invention relates to a handlebar and more particularly to a bicycle handlebar having integrally built angled ends for improved multipositioned gripping.

BACKGROUND OF INVENTION

It is becoming increasingly desirable in both competitive and recreational off road bicycling to utilize supplementary grips upon the normally straight handlebars. These grips often take the form of bar ends that mount onto the outlying opposing ends of the handlebar and extend outwardly at an angle therefrom for alternative positioned gripping by the rider. An illustration of a handlebar including such supplemental bar ends is shown in FIG. 1.

The bar ends 10 of FIG. 1 utilize one of the typical mounting configurations in which a base piece 12 is inserted into the orifice 14 of the handlebar 16 end and locked down so that the angled extension 18 of the bar end 10 projects from the base at an angle which, in this example, is approximately 45° relative to the ground, forwardly of the rider. In this orientation, the bar ends 10 allow the rider to maintain a more comfortable alternate grip upon the handlebar while riding at constant cruising speed over smooth terrain and while climbing hills.

The brake levers 20 and other controls (not shown) that are normally mounted upon the handlebar 16 are generally removed by first removing the bar end 10 and any intervening grip material 22 (neoprene, etc.). The control 20 may then be slid away from the stem 21 and off the outlying end. In particular, most modern controls include a cast base 24 accurately fitted to the specific handlebar diameter and having little ability to yield inwardly or outwardly away from that diameter, i.e., most bases may carry a specific diameter adapted for snugly mounting upon a standard sized 22.2 millimeter diameter bar. As such, the control 20 must be slid onto and over a totally unobstructed open end of the handle bar 16 down to its intended mounting location. Any significant increase in diameter along the bar 16 tends to block passage of the control. Clearly, therefore, the bar ends 10 of FIG. 1 must be fully removable in order to allow the control to be mounted or removed from the handlebar.

Removable bar ends, however, pose certain problems, particularly in competitive off road bicycle racing. The complicated mounting arrangements necessary for a removable structure adds significantly to weight which adds substantially to the overall weight of the handlebar and bicycle. Weight increases of any kind are undesirable in off road bicycle racing. Additionally, the use of removable bar ends of the type depicted in FIG. 1 has been questioned by a number of bicycle racing associations. Over the long term, the use of such bar ends may, thus, be curtailed or eliminated in competition.

One alternative to removable bar ends, that may be acceptable in competition, is an integral bar end structure. However, as noted above, an integral structure may inhibit mounting of cast control bases upon the handlebar since a bend must be placed in the bar to form the end which tends to block the passage of the control base owing to the actual increase in overall outer diameter along the bend section. In the past, the only way to overcome the problem of sliding controls over the bar end (on a constant 22.2 millimeter diameter bar) has been to form a very large continuous radius curve along the full length of the bar. This has the disadvantage in that the bar end shape no longer includes sharp angles and comfortable straight grip sections as used in detachable bar ends, and, rather, becomes awkward to grip at all positions.

SUMMARY OF THE INVENTION

It is therefore an object of the present invention to provide a handlebar that incorporates integral bar ends. It is another object of this invention to provide a handlebar having bar ends that are contoured for maximum ease of gripping.

It is another object of this invention to provide a handlebar having integral bar ends that do not add substantially to the overall weight of the handlebar.

It is yet another object of this invention to provide a handlebar having integral bar ends that facilitate easy mounting of controls, particularly those controls having cast one piece bases with relatively fixed inner diameters.

A handlebar having integral bar ends according to this invention provides an elongated tubular member. This member includes along its length a number of tapers to progressively smaller outer diameters along the member's surface outwardly from a central region. The central region itself carries an outer diameter sufficient for its mounting of a conventional stem. Opposing grip segments of the handlebar adjacent the central region carry an outer diameter substantially equal to that of conventional handlebars. Each grip segment region is relatively straight, but may include a slight bend at its joint with the central region that disposes the grip rearwardly toward the rider. In particular, this grip section carries an outer diameter sized to allow the fixable attachment of standard cast one piece control bases. As such, the outer diameter may be 22.2 millimeters.

Outwardly beyond the gripping sections upon either side of the handlebar are disposed curved bar ends. A bend is placed at the outer end of each grip section and the more outwardly disposed end portion of the bar is, thus, oriented relatively transversely to a longitudinal axis of the grip section. In particular, a 70° angle is formed between the bar end and a longitudinal axis of the grip section.

Placement of a control base onto the grip section of the bar over the bent bar end sections is facilitated by the formation, prior to bending of the ends, of a tapered outer diameter in the region of the ends. The length of the narrowed segment is chosen so that the entire bar end, when bent, carries this narrow outer diameter with the bend being formed outwardly of the taper. The outer diameter of the bar end and the radius of curvature of the joint between the grip section and bar end are accurately chosen to ensure that a conventional control base may pass around the bend onto the grip section upon the handlebar without interference. To this end, the bar end may carry an outer diameter of 20 millimeters while the average radius of curvature of the joint curve is 55 millimeters.

BRIEF DESCRIPTION OF THE DRAWINGS

The foregoing objects and advantages as well as others will become more apparent with reference to the following drawings in which:

FIG. 4 is a front view of the handlebar of FIG. 1 illustrating the mounting of a one piece cast base brake control thereon;

FIG. 5 is a partial cross sectional side view of the brake control base in a position upon the bar end section of the handlebar taken along line 5—5 of FIG. 4;

FIG. 6 is a partial cross sectional side view of the brake control base positioned along the bend joining the bar grip section and bar end taken along line 6—6 of FIG. 4;

FIG. 7 is a partial cross sectional side view of the brake control base in a final mounted position upon the handlebar grip section taken along line 7—7 of FIG. 4; and FIG. 8 is a partial exposed side view of the handlebar in an unbent state illustrating various outer diameters thereof.

DETAILED DESCRIPTION OF THE PREFERRED EMBODIMENT

Figure 1:
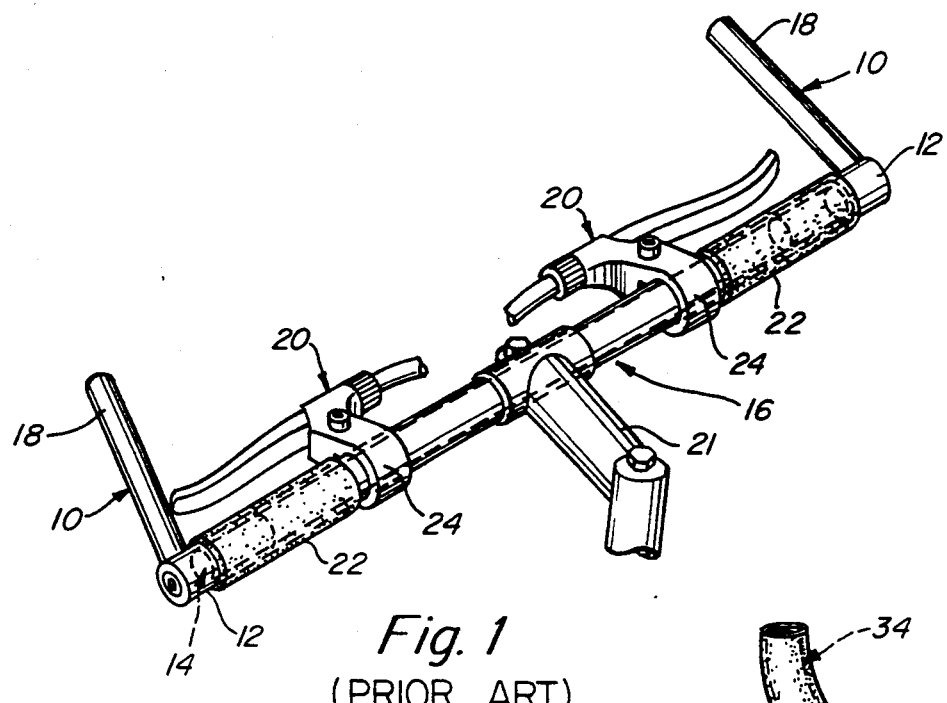
FIG. 1 is a perspective view of a prior art arrangement of removable bar ends mounted upon opposing ends of a conventional bicycle handlebar.
Figure 2:
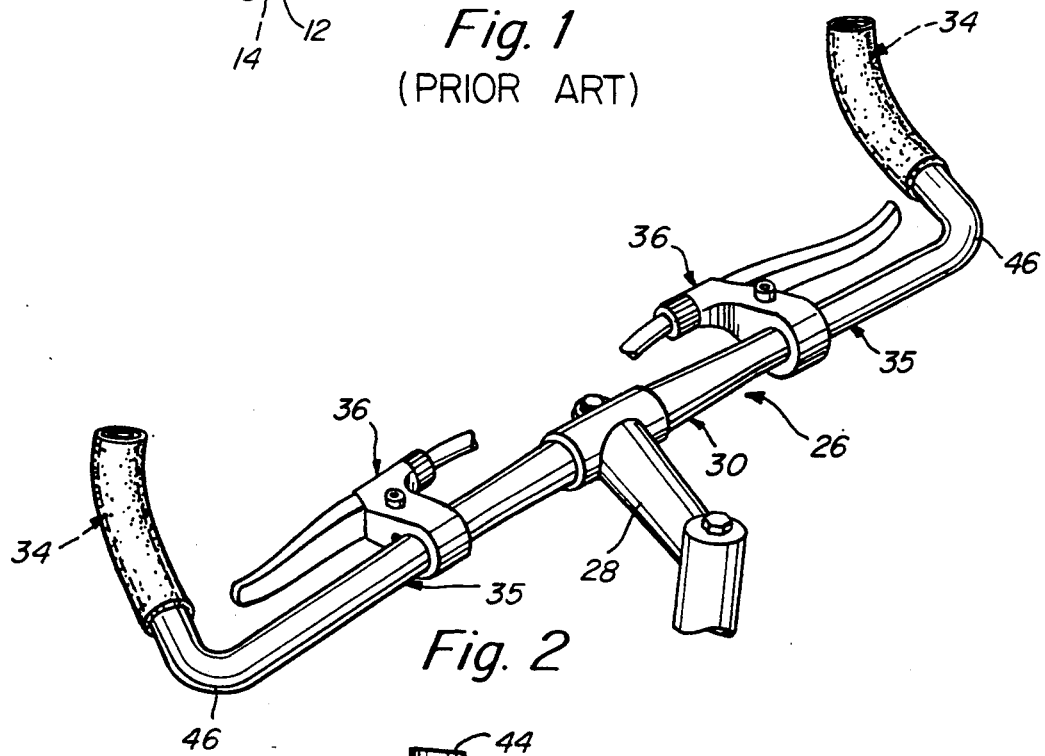
FIG. 2 is a perspective view of a handlebar having integral bar ends according to this invention.

A handlebar 26 having integral bar ends according to this invention is depicted in FIG. 2. The handlebar of this embodiment is constructed preferably of a lightweight aluminum alloy tubing such as 6061 hardened to T6. Alternatively, a lighter weight 2014 alloy may be employed. Secondary bar strengthening may be required where necessary (such as at the center 30 region of the bar) using such an alloy. The handlebar 26 is mounted at its center to a conventional handlebar stem and clamping arrangement 28. To this end, the centermost section 30 of the handlebar carries an outer diameter of 25.4 millimeters and includes a standard splined surface 32 for improved grip upon tightening of the stem clamp 28 (see also, for example, FIG. 4).

Upon each outlying end of the handlebar is formed a curved bar end 34 that in this example projects at roughly a 45° angle relative to the ground forwardly away from the rider. The precise angle of the bar ends 34 relative to the ground may be varied at the option of the rider by simply rotating the handlebar 26 while the stem clamp 28 is loosened and then retightening the stem clamp 28 once the desired angle is obtained.

Figure 3:
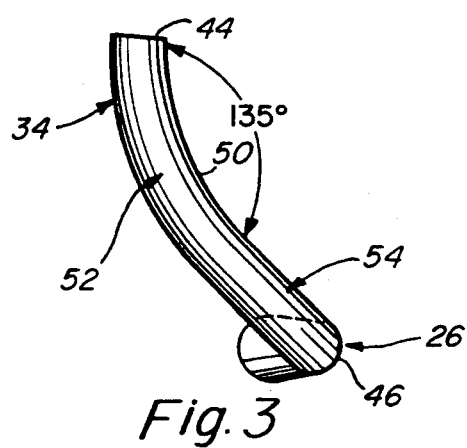
FIG. 3 is a partially exposed side view of the handlebar of FIG. 2.

The particular structure of the handlebar 26 according to this embodiment is illustrated in FIGS. 3-4. As viewed from a frontal orientation (FIG. 4), the central region 30 of the handlebar 26 carries the largest diameter D. This diameter is constant in the region of the splines 32 at which a stem clamp is located. From this region 30 the bar tapers in opposite directions to a 22.2 millimeter diameter (C) grip section 35. This is the standard diameter for conventional handlebars and thus enables the mounting of standard one piece control bases such as the brake lever 36 shown in FIG. 4. The 22.2 millimeter diameter grip section 35 is disposed upon either side of the handlebar central region 30 at a distance normally adapted for gripping and mounting of controls in similar length conventional handlebars having no ends which, in this example, is a range of approximately 560-580 millimeters.

The grip sections 35 according to this embodiment include a 5° bend 38 along their longitudinal axes 40 relative to the longitudinal axis 42 of the central region 30. This bend 38 creates an offset that facilitates improved gripping and control.

Proximate the outer ends of the handlebar 26 are formed the angled bar ends 34. According to this embodiment, the ends 34 are accurately bent at points approximately 140 millimeters inwardly from their respective outermost edges 44 to a 70° angle with respect to the longitudinal axis 40 of the respective grip section 35. The average radius of the bar end to gripping section bend 46 at its longitudinal (central) axis 48 is accurately gaged at 55 millimeters in this example for reasons discussed further below. The bar end 34, outwardly of its relatively narrow bend point or region 46, remains substantially straight as viewed from the front (FIG. 4) facilitating desirable gripping comfort. However, as illustrated in the side view of FIG. 3, a transverse secondary bend 50 initiates in each bar end 34 approximately midway along the bar end segment of the handlebar 26. The secondary bend 50 occurs upon the more outlying section 52 which, in this example, comprises a continuous curve such that the outermost edge 44 of each bar end segment is disposed approximately 135° (as shown) relative to the unbent inwardly disposed section 54 of the end segment. The secondary bend 50 is designed to optimize the rider's grip at various positions along the bar end segment 34.

As noted, while an integral bar end structure, with substantially straight segments and tight joint curves, according to this invention is generally preferable to removable bar ends, conventional control bases having a relatively fixed inner diameter (approximately 22 millimeters) cannot easily pass over the bend point necessary to form the bar end (between the bar end segment and the remaining inboard bar) unless special handlebar formation techniques are employed. Thus, the handlebar according to this embodiment is formed with a plurality of outer diameters along its length. FIG. 8 depicts one side of the bar as it tapers from its central region 30 outwardly to the grip section 35 and then further tapers outwardly to the bar end segment 34. The grip section-to-bar end taper 56 has a length L in the range of 15 millimeters in length according to this example.

The outer diameter (A and B) of the bar end segment 34 is generated by forming, drawing, or otherwise reducing the dimension of the handlebar outer surface and approximates 20 millimeters in this example. By subsequently bending the segment outwardly of its taper 56 at a constant 55 millimeter radius, a fixed inner diameter control base may pass unobstructed around the joint curve onto the grip section 35 of the handlebar 26. The clearance of such a control base (36) having a particular longitudinal width W over each of the bar end 34, curved joint 46 and grip sections 35 of the handlebar 26 is shown respectively in each of FIGS. 5, 6 and 7. Note that the base 36 of this example includes a slot 58 and pinch screw 60 to provide mounting pressure by slightly decreasing the base mounting hole 62 diameter (E in FIG. 5).

It is important, in order to avoid the necessity to overly thin outer walled bar end section, that the initiation of joint bend 46 occur sufficiently far outwardly of the end segment taper 56 so that the base 36 does not become obstructed by the increasing taper diameter as it is moved around the joint bend 46 toward the grip section 35. In other words, as the base is moved onto the handlebar, toward the center, it should clear the bend before encountering the taper.

In this particular example, the bar end segments 34 are drawn from a 22.2 millimeter outer diameter tube to obtain the desired decreased outer diameter (A and B) after the center region is first compressed to obtain the larger 25.4 millimeter diameter D of the central region 30. It is important that the central region maintain a wall thickness sufficient to provide sufficient structural strength to withstand normal loads. As noted, secondary strengthening such as butting (with mandrels) or attachment of collars may be utilized to obtain a desired thickness. In this example, an unformed tube thickness 64 of 1.8 millimeters is employed, but other thicknesses may be contemplated based upon weight, strength, construction and material considerations.

Subsequent to intial straight tube forming, the bar end segments are accurately bent using a die along their initial bend joints 46. The transverse bar end segment 52 are then formed. Finally, a 5° (angle of offset) bend is placed between each grip section 35 and the centermost region 30 to give the bar a slightly swept shape.

It should be understood that the preceding is merely a detailed description of a preferred embodiment. It should be apparent to those skilled in the art that various modifications and equivalents may be made without departing from the spirit or scope of the invention. The preceding description is meant to be taken only by way of example and to describe only a preferred embodiment and not to otherwise limit the scope of the invention. For example, various dimensions of the handlebar may be altered with corresponding variations in bend angles, bend radii and tube thicknesses to obtain similar advantageous characteristics to those described with reference to the preferred embodiment.

What is claimed is:

1. A one-piece handlebar for use with a brake control assembly having a pinch clamp base for mounting the brake control assembly to the handlebar comprising:
   a first central grip section having a first outer diameter sized for mounting the pinch clamp base thereon;
   a pair of second grip sections each extending from each of respective opposing ends of the central grip section, the second grip sections being unitary with the central grip section and being connected to the central grip section by substantially sharply curved sections having a predetermined rapid radius of curvature wherein ends of the sharply curved sections adjacent the opposing ends of the central grip section have a steady decreasing diameter taper so that the sharply curved sections have a second outer diameter that is less than the first outer diameter of the central grip section so that the pinch clamp passes over the sharply curved sections free of increase of the hole diameter substantially beyond the first diameter and thereby free of resistance to passage of the clamp over the sharply curved sections.

2. The handlebar as set forth in claim 1 wherein an end of the central grip section and an end of each of the second grip sections define an angle of 70° with respect to each other proximate a transition point therebetween.

3. The handlebar as set forth in claim 2 wherein the first outer diameter is 22.2 millimeters and the second outer diameter is 20 millimeters.

4. The handlebar as set forth in claim 3 wherein the radius of curvature is 55 millimeters.

5. The handlebar as set forth in claim 4 wherein the central grip section defines a length between each of the opposing ends of the central grip section in a range of 560–580 millimeters.

6. The handlebar as set forth in claim 1 wherein the central grip section includes a central region and a pair of oppositely directed outwardly extending grip sections joined to the central region at corresponding transition points, the grip sections defining an obtuse angle at each of the corresponding transition points with the central region.

7. The handlebar as set forth in claim 6 wherein the obtuse angle of the grip sections of central grip section relative to the central region is 5°.

8. A handlebar as set forth in claim 6 wherein the grip sections of the central grip section include an outer diameter equal to the first outer diameter and wherein the central region includes an outer diameter larger than the first outer diameter.

9. A handlebar as set forth in claim 8 wherein the outer diameter of the central region is 25.4 millimeters.

10. A handlebar as set forth in claim 1 wherein each of the second grip sections includes a second bend along a longitudinal portion thereof disposed proximate an outer end, the bend of each of the second grip portions being parallel with the bend of the other of the second grip portions.

11. The handlebar as set forth in claim 10 wherein the second bend of each of the second grip portions is constructed and arranged so that an outer most portion of each of the second grip portions is at a 135° angle relative to a more inwardly disposed portion of each of the second grip portions.

12. A handlebar as set forth in claim 1 wherein each of the second grip portions is substantially straight along a portion thereof outwardly of a respective of the sharply curved sections joined thereto.

* * * * *